US011086780B1

(12) United States Patent
Glimcher et al.

(10) Patent No.: US 11,086,780 B1
(45) Date of Patent: Aug. 10, 2021

(54) SCRATCHPAD JOURNALING MECHANISM FOR PERFORMANCE OPTIMIZATION

(71) Applicant: EMC IP Holding Company LLC, Hopkinton, MA (US)

(72) Inventors: Boris Glimcher, Bnei Brak (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/826,856

(22) Filed: Mar. 23, 2020

(51) Int. Cl.
*G06F 12/0842* (2016.01)
*G06F 3/06* (2006.01)
*G06F 11/20* (2006.01)
*G06F 12/1018* (2016.01)

(52) U.S. Cl.
CPC ......... *G06F 12/0842* (2013.01); *G06F 3/065* (2013.01); *G06F 11/2056* (2013.01); *G06F 11/2084* (2013.01); *G06F 3/064* (2013.01); *G06F 3/0617* (2013.01); *G06F 3/0683* (2013.01); *G06F 11/2058* (2013.01); *G06F 12/1018* (2013.01); *G06F 2212/604* (2013.01); *G06F 2212/608* (2013.01)

(58) Field of Classification Search
CPC ...... G06F 3/0617; G06F 3/0644; G06F 3/065; G06F 3/0683; G06F 3/0685; G06F 3/0688; G06F 12/0842; G06F 12/0864; G06F 12/1018; G06F 2212/286; G06F 2212/604; G06F 2212/608; G06F 3/064; G06F 11/2056; G06F 11/2058; G06F 11/2084
USPC ...................................................... 711/119
See application file for complete search history.

(56) References Cited

U.S. PATENT DOCUMENTS

| 6,230,240 | B1 * | 5/2001 | Shrader ................. G06F 3/0607 710/302 |
| 6,574,709 | B1 * | 6/2003 | Skazinski ........... G06F 11/2092 711/119 |
| 8,046,551 | B1 * | 10/2011 | Sahin .................. G06F 12/0866 711/162 |
| 9,104,326 | B2 | 8/2015 | Frank et al. |
| 9,208,162 | B1 | 12/2015 | Hallak et al. |

(Continued)

OTHER PUBLICATIONS

I. Huang, C. Lai, Y. Yang, H. Dow and H. Chen, "A Reconfigurable Cache for Efficient Use of Tag RAM as Scratch-Pad Memory," in IEEE Transactions on Very Large Scale Integration (VLSI) Systems, vol. 26, No. 4, pp. 663-670, Apr. 2018, doi: 10.1109/TVLSI. 2017.2785222. (Year: 2018).*

*Primary Examiner* — Reginald G Bragdon
*Assistant Examiner* — Aaron D Ho
(74) *Attorney, Agent, or Firm* — Daly, Crowley Mofford & Durkee, LLP

(57) ABSTRACT

An aspect includes providing a scratchpad memory to at least one persistent storage device of a plurality of persistent storage devices in a storage array. The scratchpad memory includes non-volatile storage. An aspect also includes designating the scratchpad memory for storing data corresponding to write operations implemented by a storage system, apportioning the scratchpad memory among each storage controller of a plurality of storage controllers in the storage system, and receiving, at the scratchpad memory, a write request from one of the storage controllers. An aspect further includes writing data of the write request to a location in the scratchpad memory based on the apportioning and corresponding to the one of the storage controllers.

20 Claims, 8 Drawing Sheets

(56) References Cited

U.S. PATENT DOCUMENTS

| | | | |
|---|---|---|---|
| 9,378,106 B1 | 6/2016 | Ben-Moshe et al. | |
| 9,396,243 B1 | 7/2016 | Halevi et al. | |
| 9,753,645 B1* | 9/2017 | McBride | G06F 12/0868 |
| 2006/0117159 A1* | 6/2006 | Ohara | G06F 11/2089 |
| | | | 711/165 |
| 2009/0006716 A1* | 1/2009 | Lubbers | G06F 3/0683 |
| | | | 711/100 |
| 2009/0019492 A1* | 1/2009 | Grasset | G06F 16/178 |
| | | | 725/45 |
| 2016/0070652 A1* | 3/2016 | Sundararaman | G06F 3/065 |
| | | | 711/154 |
| 2016/0306744 A1* | 10/2016 | Kampe | G06F 11/1666 |
| 2017/0168931 A1* | 6/2017 | Kim | G11C 11/4093 |
| 2018/0165097 A1* | 6/2018 | Hanley | G06F 12/1441 |

\* cited by examiner

SCRATCHPAD JOURNALING MECHANISM FOR PERFORMANCE OPTIMIZATION

BACKGROUND

Modern storage systems leverage flash drives to provide fast, reliable deduplicated compressible, in-place-update storage. One of the challenges faced with these storage systems is write performance during input/output (IO) storage operations (e.g., minimizing latency and maximizing bandwidth). Various techniques have been developed to improve write performance in storage systems while maintaining high availability (HA).

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for scratchpad journaling. The method includes providing a scratchpad memory to at least one persistent storage device of a plurality of persistent storage devices in a storage array. The scratchpad memory includes non-volatile storage. The method also includes designating the scratchpad memory for storing data corresponding to write operations implemented by a storage system, apportioning the scratchpad memory among each storage controller of a plurality of storage controllers in the storage system, and receiving, at the scratchpad memory, a write request from one of the storage controllers. The method further includes writing data of the write request to a location in the scratchpad memory based on the apportioning and corresponding to the one of the storage controllers.

Another aspect may provide a system for scratchpad journaling. The system includes a memory having computer-executable instructions. The system also includes a processor operated by a storage system. The processor executes the computer-executable instructions. When executed by the processor, the computer-executable instructions cause the processor to perform operations. The operations include providing a scratchpad memory to at least one persistent storage device of a plurality of persistent storage devices in a storage array. The scratchpad memory includes non-volatile storage. The operations also include designating the scratchpad memory for storing data corresponding to write operations implemented by a storage system, apportioning the scratchpad memory among each storage controller of a plurality of storage controllers in the storage system, and receiving, at the scratchpad memory, a write request from one of the storage controllers. The operations further include writing data of the write request to a location in the scratchpad memory based on the apportioning and corresponding to the one of the storage controllers.

Another aspect may provide a computer program product embodied on a non-transitory computer readable medium. The computer program product performs scratchpad journaling. The computer program product includes instructions that, when executed by a computer at a storage system, causes the computer to perform operations. The operations include providing a scratchpad memory to at least one persistent storage device of a plurality of persistent storage devices in a storage array. The scratchpad memory includes non-volatile storage. The operations also include designating the scratchpad memory for storing data corresponding to write operations implemented by a storage system, apportioning the scratchpad memory among each storage controller of a plurality of storage controllers in the storage system, and receiving, at the scratchpad memory, a write request from one of the storage controllers. The operations further include writing data of the write request to a location in the scratchpad memory based on the apportioning and corresponding to the one of the storage controllers.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1A:
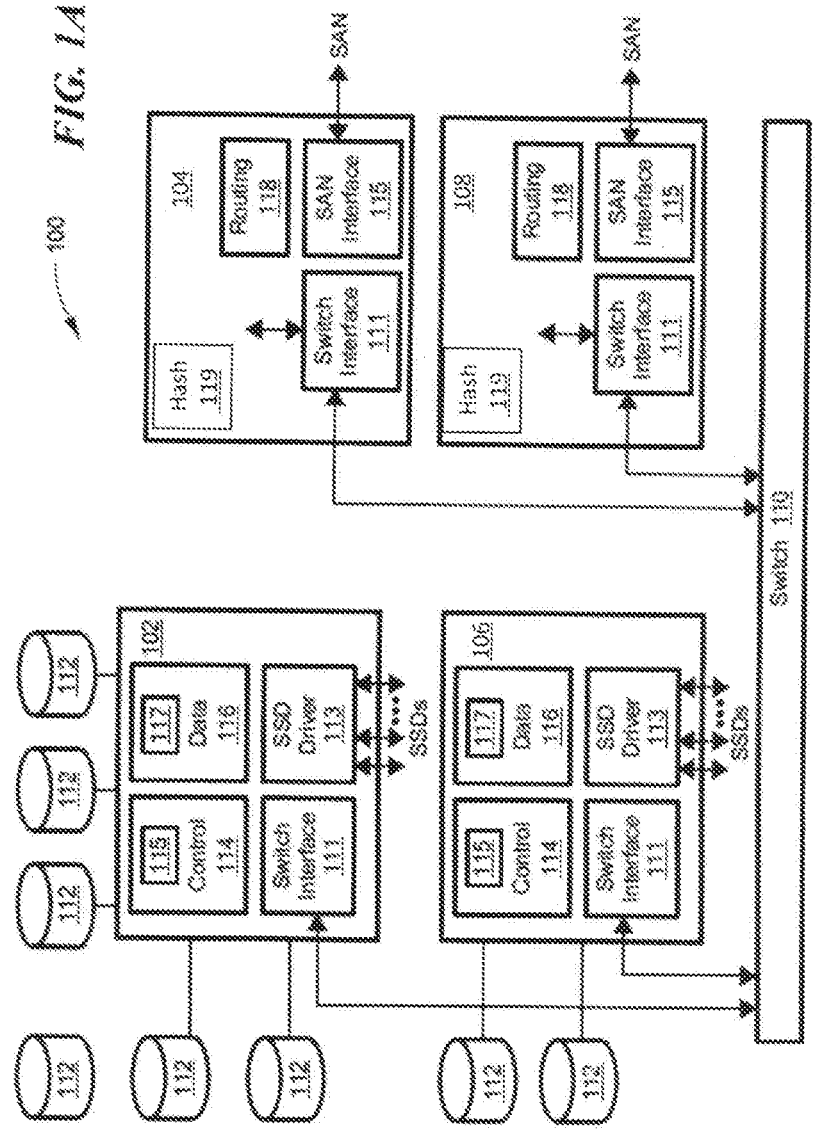
FIG. 1A is a block diagram of a content-based storage system having multi-level cache.

As indicated above, one of the challenges faced with storage systems is write performance during input/output (IO) storage operations (e.g., minimizing latency and maximizing bandwidth). Various techniques have been developed in an effort to improve write performance in storage systems while maintaining high availability (HA). Embodiments described herein provide a technique for optimizing write operations that can reduce latency and increase bandwidth by aggregating multiple write operations while preserving persistency for high availability and off-the shelf hardware.

Before further description of the embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client;" "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "IO request" or simply "IO" or "I/O" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)(also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (DDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit, may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, XtremIO (available from Dell EMC of Hopkinton Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data. In an exemplary Content Addressable Storage (CAS) array (e.g., as described in U.S. Pat. No. 9,208,162 (hereinafter "162 patent")), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it can be faster to send the data without a hash signature, and let the target calculate the hash signature.) While the hash handles are readily available without the need to read from Flash, since the hash handles are not unique, they cannot be easily used to check if a target contains a hash signature. In some implementations, hash handles are shortcuts for hash signatures, and can give a reliable hint of the existence of a hash signature in an array.

It is envisioned that at least some embodiments herein are usable with embodiments described in commonly owned U.S. Pat. No. 9,104,326 ("Scalable Block Data Storage Using Content Addressing," hereinafter "326 patent"), which is hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example." "e.g.," "exemplary." and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches. In the storage system 100, first, second, third, and fourth nodes 102, 104, 106, 108 can be interconnected by a switch 110 via a switch interface 111. The first node 102 can include a control system 114 and a data system 116. Separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. The data extracts may be generated by cryptographic hashing of the data content in the data blocks. The extracts may be used for content addressing of the data blocks to the physical storage devices 112.

The second node 104 can include a hash system 119 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the Figure, the third node 106 can be similar to the first node 102 and the fourth node 108 can be similar to the second node 104.

The routing systems 118 (also referred to herein as routing modules, or R modules) may use the hash values calculated from data blocks to select control systems 114 for distribution. More particularly, selection of the control system 114 may use hash values or may rely on the user address and not on the content (hash). The hash value may, however, be used for selecting the data system 116, and for setting the physical location for data storage within the data system.

Control system 114 (also referred to as control modules or "C Module") can include a C cache 115 and the data system 116 (also referred to as data modules or "D Module") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. Data mapping may optimize performance and life span by taking advantage of the different access speeds and different write/erase cycle limitations of the various memory technologies.

Figure 1B:
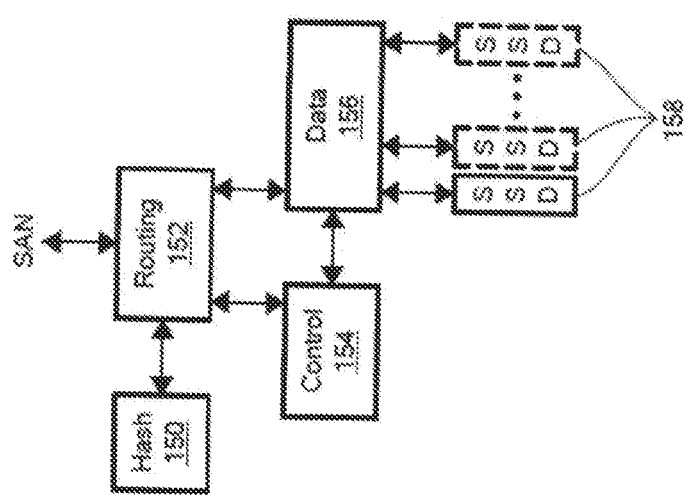
FIG. 1B illustrates further details of the system of FIG. 1A.

FIG. 1B is an example of a system that can include a hash (H) system 150 communicatively coupled to a routing (R) system 152 (also referred to as routing module), which can be communicatively coupled to a control (C) system 154 (also referred to as control module) and a data (D) system 156 (also referred to as data module). The data system 156 can be communicatively coupled to any practical number of storage devices 158. The routing system 152 can route read/write commands from a host (not shown) to control and data systems 154, 156, respectively, for execution. The data content-based mapping to physical storage 158 can distribute workload relatively evenly and provide separation of the control and data paths. Read and write operations to the physical storage (SSDs) 158 can be used to generate priority values for the data blocks, as described more fully below. The routing system 152 may correspond to the routing system 118 of FIG. 1A. The control system 154 may correspond to the control system 114 of FIG. 1A. The data system 156 may correspond to the data system 116 of FIG. 1A.

A function of the H module 150 is to calculate the Hash function value for a given block of data, e.g., data which is the subject of storage commands. The hash values calculated may later be used for retrieval. The Hash function may be based on standards-based hash functions such as SHA-1 and MD5, or based on a proprietary function, but this is not limiting. The hash function is selected to generate a uniformly distributed output over the range of potential input values. H modules 150 share nodes with an R module 152, but that is not limiting. More generally, the H modules 150 can reside in certain nodes, in all nodes, together with R modules 152, or together with C modules 154 or D modules 156.

A function of the R module 152 is to terminate storage area network (SAN) Read/Write commands and route them to appropriate C and D modules 154 and 156, for execution by these modules. By doing so, the R module 152 can distribute workload over multiple C and D modules 154, 156, and at the same time create complete separation of the Control and Data planes, that is to say provide separate control and data paths. The R module routes SCSI IO request to the C modules 154, guarantees execution, and returns the result. The R module 152 maintains an up to date data structure called an address-to-control module (A→C or A2C) table, coordinated with the management back end (MBD), indicating which C module 154 is responsible for each logical X-page address (LXA), and also showing a balance a range of all possible LXAs between available C modules 154. For write operations, the R module 152 instructs the calculation of a hash digest for each X-page by requesting such calculation from a hash calculation module (e.g., the H system 150). The H system is also referred to herein as H module.

A function of the C module 154 is to control the execution of a Read/Write (R/W) command, as well as other storage functions implemented by the system. The C module 154 also may maintain and manage key metadata elements. The C module 154 receives an IO request from an R module 152 on a certain sub-LUN (SL), guaranteeing its atomic execution (i.e., execution independent of other processes) and returns the result to the R module 152. The C module 154 also communicates with D modules 156 to execute the IO requests. In addition, the C module 154 monitors the disk content of its logical space by associating each LXA with its hash digest; and balances the work load between the D modules fir the SLs that the C module 154 is maintaining. The C module 154 and data module 156 each maintains certain data structures and corresponding metadata journals for those data structures. For example, the C module 154 maintains an "address to hash" table (A2H table, also referred to herein as A-H table) and corresponding A2H metadata journal, in the C module 154. The D module 156 maintains the "hash to physical location of data" table (H2P table, also referred to herein as H→P table) and its corresponding metadata journal in the D module 156. That is, the in-memory copy of a journal is in the same module as the corresponding metadata table. The on-disk journal copy is persisted and mirrored across nodes in the cluster in journal disk chunks.

The A2H table maps each LXA that belongs to the SLs that the C module 154 is responsible for, to the hash digest representing the X-page Data that currently resides in that address. The C module 154 maintains an A2H table in a persistent way. The C module 154 may initiate requests to D modules 156 in order to save table pages to disk and read them from disk. In addition, to avoid frequent disk operations, the C module 154 maintains a journal certain of the latest table operations. These journals include (but are not limited to) the A2H metadata journals (A2H Hash tree) and dirty tree update metadata journals. The dirty tree and corresponding functionality are described further in commonly assigned U.S. patent application Ser. No. 15/656,168 entitled "Online Metadata Backup Consistency Check," filed on Jul. 21, 2017, which is hereby incorporated by reference.

The data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals. For example, the metadata journals include information associated with time-based changes to information in the respective A2H and H2P tables and time-based changes to the disk block allocation bitmap.

The H2P table maps each range of hash digests to the corresponding D module 156 responsible for that range. The H2P table balances the range of all possible hash digests between the available D modules 156.

A function of the D module 156 is to perform the actual read/write (R/W) operation by accessing the storage devices 158 attached to it. The D module 156 may maintain metadata related with the physical location of data blocks. The D module 156 is responsible for: maintaining a set of LUNs which are attached locally and performing all IO operations on these LUN; managing the physical layout of the attached LUNs; managing the mapping between X-Page Data hash digests and their physical location in a persistent way; managing deduplication of X-Page Data in a persistent way; and receiving disk IO requests from C modules 154, perform them and returning a result.

The D module 156 is also responsible for, for each write operation, backing up the X-Page Data in the designated D backup module and performing read-modify operations for writes that are smaller than X-Page size (This process also involves computing a hash digest for these X-Pages). The D module 156 maintains an up-to-date H→(D, $D_{backup}$) table coordinated with the MBE, where the H→(D, $D_{backup}$) table is expected to balance the range of all possible hash digests between the available D modules 156.

Balancing between the D modules is based on hashing of the content. For example, the D module 156 makes use of a hash digest metadata table. The hash digest metadata table maps each in use hash digest, that represents actual X-Page Data, to its metadata information including its physical page on the storage media (SSD) its memory copy (if exists), a mapping to any backup memory copy and a reference count for the purpose of deduplication. The D modules 156 manage a separate nonvolatile memory pool (NVRAM or UPS protected) for X-Page Data backup purposes. The backup holds X-Pages that are held in memory of the D primary and have not yet been de-staged. This is an example of the user data de-stage cache (UDC). There are dirty X-pages waiting to be persisted on disk. When re-balancing between D modules 156 occurs (due to a D module 156 failure for example), the D module 156 may communicate with other D modules 156 in order to create new backup copies or move a primary ownership as required.

The D modules 156 allow deduplication per X-Page Data by maintaining a persistent reference count that guarantees only one copy per X-Page Data. The D modules 156 manage the hash digest metadata table in a persistent way. The table is coordinated with the physical layout for physical pages allocation, with the memory pointer, memory backup pointer, and deduplication reference count.

As will be appreciated, the R, C, D, and H modules 150-156 may be implemented in software, and executed on a physical node. In addition, the aforementioned '326 patent provides information relating to additional functionality of the R, C, D, and H modules 150-156, in certain embodiments.

Figure 2:
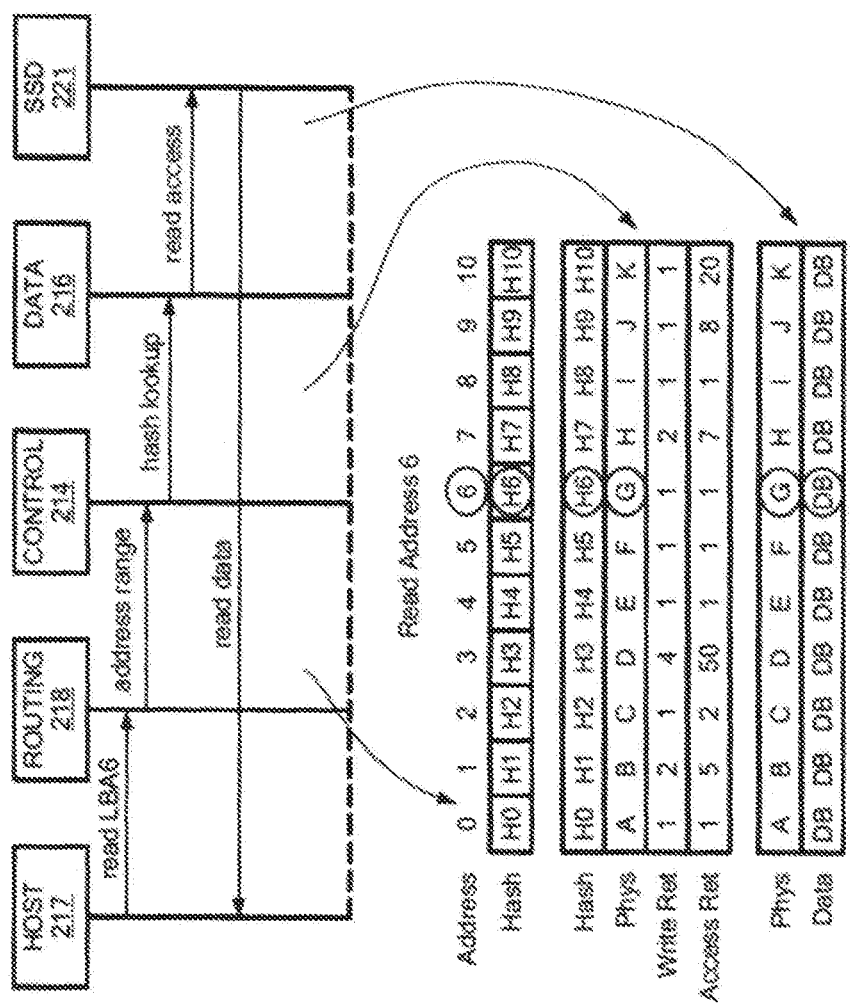
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 (also referred to as routing module) may receive the read command and determine a requested address range in data blocks of 4K, for example, and pass the address information to control system 214 (also referred to as control module). The control system 214 may look up address 6 to obtain the hash value, which is shown as H6. This may be referred to as address-to-hash (A2H) lookup. The H6 hash value may be passed to the data system 216 (also referred to as data module) which can perform a look up of the 16 hash value in a hash-to-physical address (H2P) table to read the physical address for the data. In the example, the physical address is shown as "G." The data system 216 can use the physical address to read the data block 11) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. The write reference information and/or the access reference information can be modified. e.g., incremented.

If the hash value generated by the routing system 218 is not unique, the control system 214 can determine that data already exists at the physical address for the hash value. Since the data already exists, the data system 216 can increment the write reference information for the data block. The access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
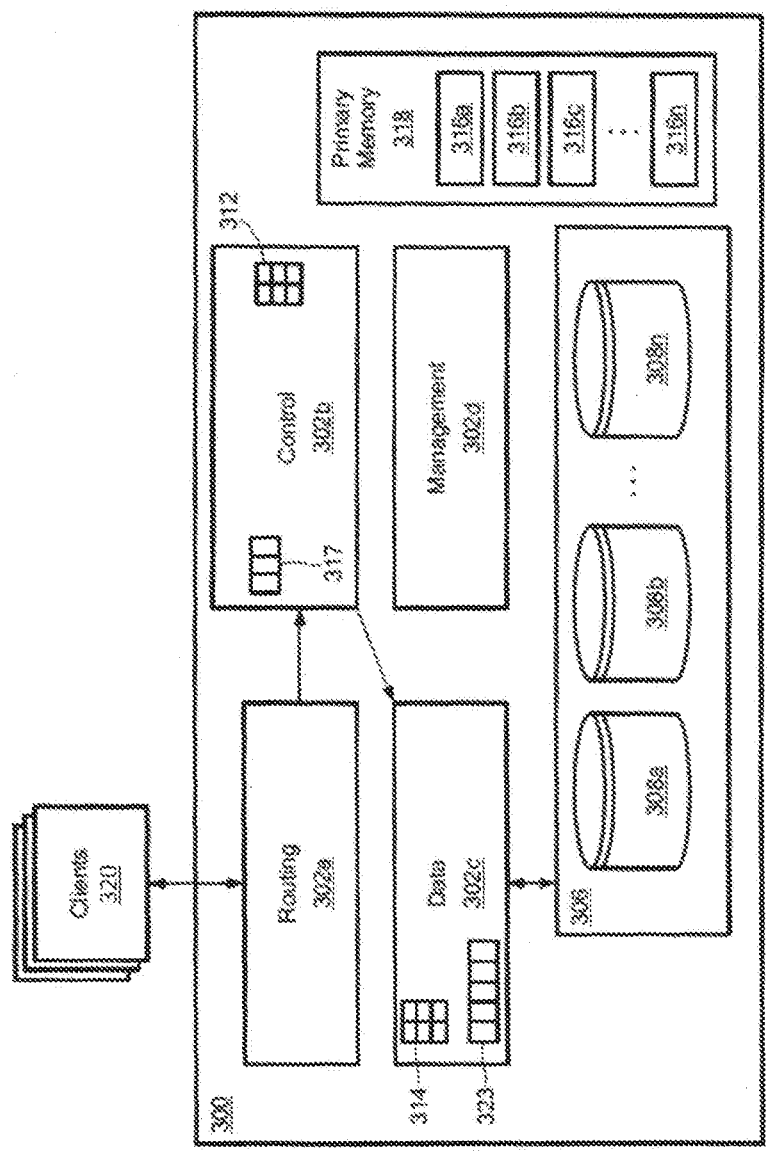
FIG. 3 is a block diagram of a content-based storage system having a control module with a first cache and a data module with a second cache.

FIG. 3 illustrates a storage system 300. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. The storage devices 308 may be provided as solid-state devices (SSDs) 316a-316n. The modules include a routing subsystem 302a, a control subsystem 302b, a data subsystem 302c, and a management subsystem 302d. These subsystems may also be referred to as respective routing module 302a, control module 302b, data module 302c, and management module 302d.

As described further herein, the storage system 300 also can include a C (also called logical) cache 317 and a D (also called physical) cache 323. The C cache 317 and/or the D cache 323 can be physical devices configured to store certain data so that future requests for that data can be served faster. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between IO addresses associated with data and the corresponding chunk hashes. As shown in FIG. 3, this mapping may be maintained using a data structure 312, referred to herein as an "IO address to chunk hash mapping table" or "A2H table." (also known as A→H table). IO addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. As described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"), U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

Address to hash mapping (A2H) maps an address inside a volume to the short hash value of its data. Metadata can include for each address the hash value of the content. If the basis for deduplication is 16 KB, then the metadata holds for each address the short hash value of the data to which the address points. In cases where access to the volume is in larger chunks than the size of the basic hash value, the metadata for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the metadata of the hash from the disk to verify if such a hash exists. It will be appreciated that metadata structures may consume most of system memory, e.g., DRAM, in the storage system, so that the metadata limits the total size of the storage system.

Figure 4:
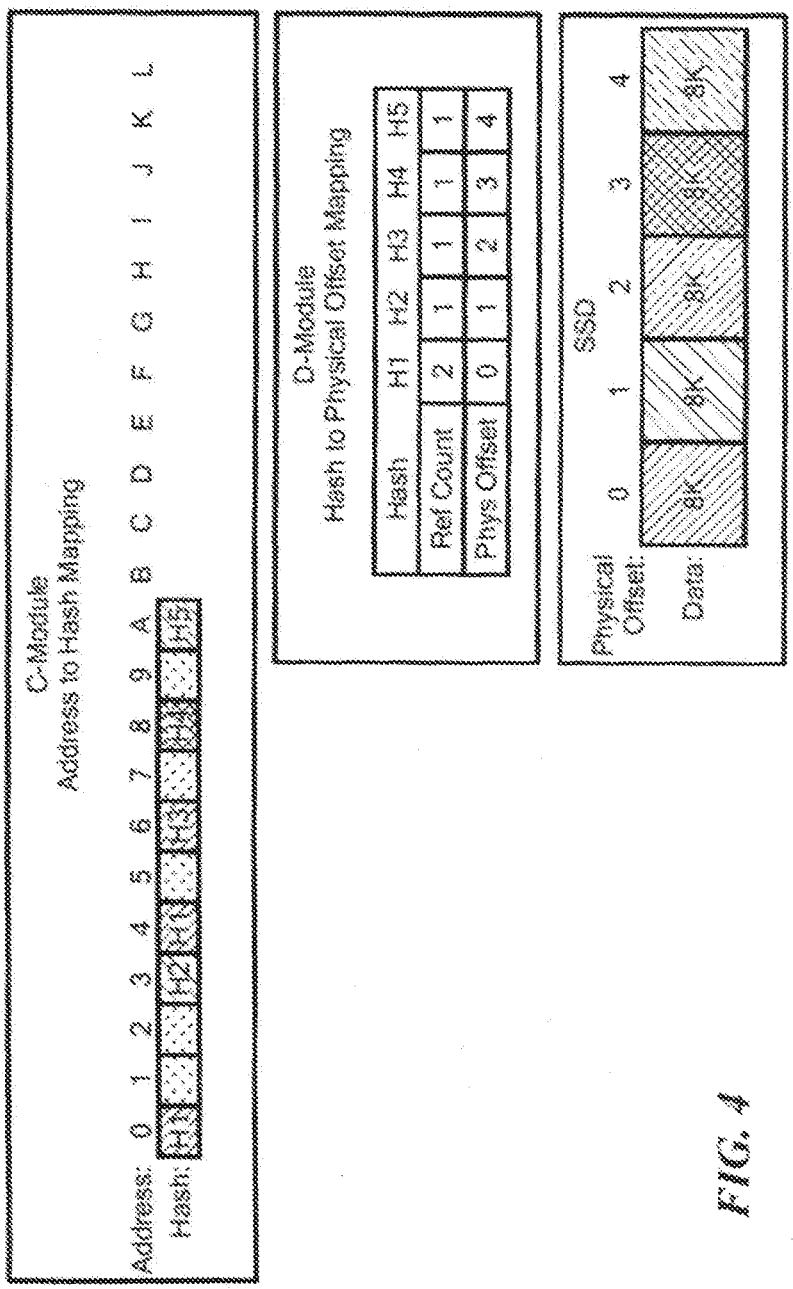
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. A reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

For a particular volume, an address to hash mapping maps an address inside the volume to the short hash value of its data. Metadata includes for each address the hash value of the content. If the basis for deduplication is 16 KB, then the metadata holds, for each address, the short hash value of the data to which the address points. In cases where access to the volume is in larger chunks than the size of the basic hash value, the metadata for the address space can be cached. Any suitable caching algorithm can be used, such as LRU (least recently used). For example, read accesses may be sequential with so-called hot spots for certain access areas. A system can implement a C cache for the metadata of the A2H table by using LRU caching with prefetching of nearby metadata. The full A2H table may be stored on the disk.

In a content-addressable storage system, such as XtremIO, in order to improve write performance a stack may use a write cache mechanism. As described above, the write cache resides in a persistent media in each of the storage controllers and is used by control modules (e.g., control module 302b of FIG. 3) to journal user data. The write cache may correspond to the C cache 317 of FIG. 3. In this manner, replies to user requests can be provided much earlier (as compared to having to access the actual drives). For high availability, each journal write may be replicated to the next node for safe keeping. The write cache resides on a fast-persistent media (e.g., non-volatile random access memory (NVRAM) or non-volatile dual in-line memory module (NVDIMM)) and the fast-persistent media is small in size or capacity in order to increase write performance.

The concept of providing this write cache in the control modules has certain challenges. Persistent memories, such as NVRAM, NVDIMM, etc. are not considered to be "off the shelf" components and are generally not found in such servers. It would be desirable to have storage controllers (also referred to as initiators) to be off the shelf servers, as it is less expensive and would support virtualized and containerized configuration. In addition, providing the write cache in the control modules results in certain performance inefficiencies, as the data is initially kept in the fast-persistent media but during a de-stage operation, it needs to be moved to the storage array.

In embodiments described herein, a technique for optimizing write operations that can reduce latency and increase bandwidth by aggregating multiple write operations while preserving persistency for high availability and off-the shelf hardware are provided. For example, existing techniques operate on a single write command having one block of data and one offset indicating a location in which the data (or metadata) is to be written. The embodiments enable multiple write operations in which several write blocks are aggregated with corresponding metadata into a single write operation, which can increase storage system performance.

In embodiments, a scratchpad and store command are implemented for improving write operations in terms of minimizing latencies and maximizing bandwidth. Rather than maintaining a write cache in the control modules, the scratchpad (which is implemented, in part, using a non-volatile unit of storage) is provided in one or more persistent storage devices in a storage array and is implemented in lieu of the write cache. The scratchpad may be implemented as a pool of DRAM/NVDIMM pages that are allocated for each of a plurality of storage controllers and are externally managed by a client of the storage array. The scratchpad may be implemented using physical storage, virtual storage, or a combination thereof. The management of the scratchpad is provided by the storage array.

Figure 5:
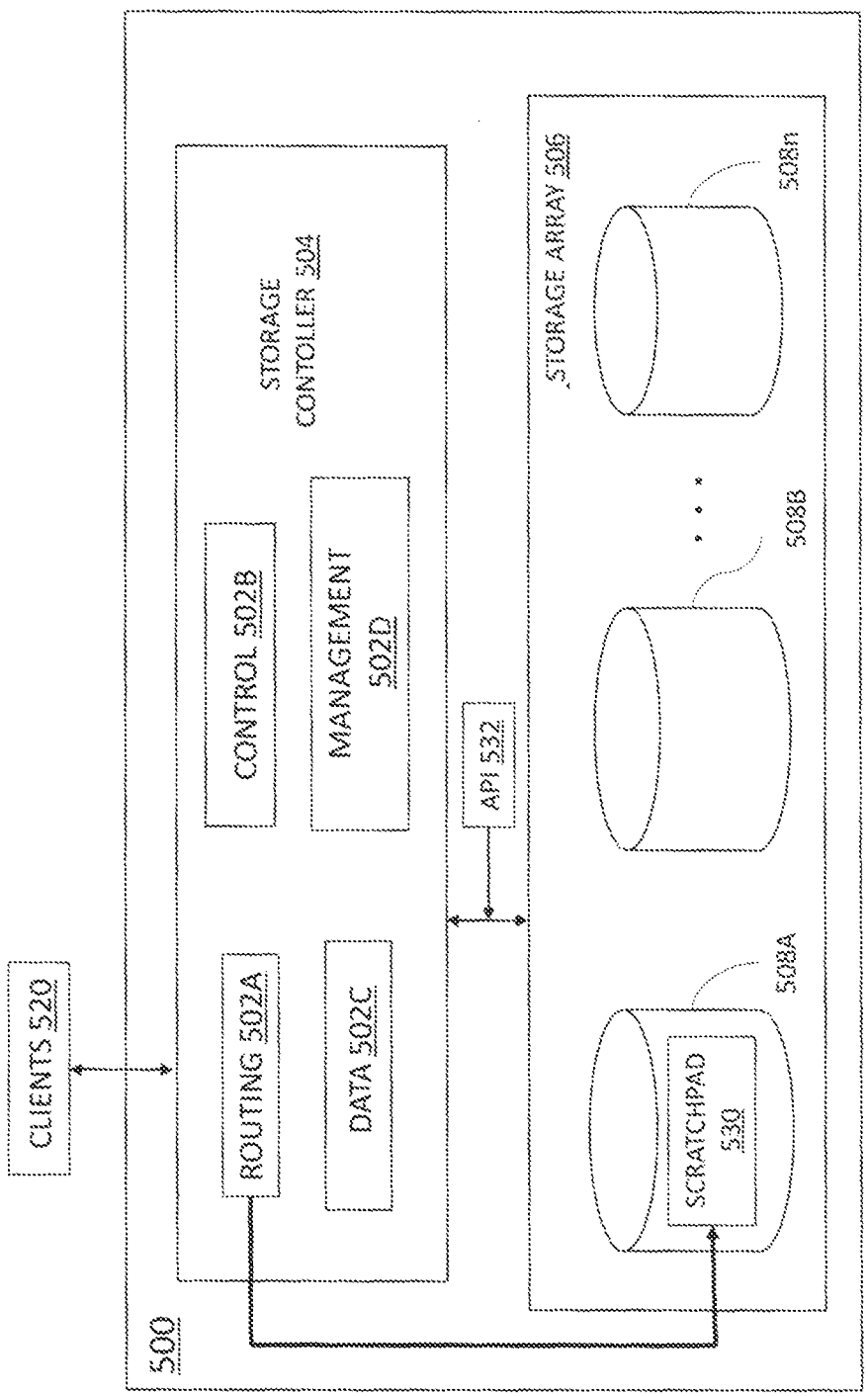
FIG. 5 is a block diagram of a content-based storage system in accordance with an embodiment.

Turning now to FIG. 5, a portion of a storage system 500 for scratchpad journaling will now be described in accordance with embodiments. Some of the components described in the system 500 of FIG. 5 may be similar to those described above with respect to FIG. 3 and will not be described further. The storage system 500 includes a storage controller 504 that further includes a routing module 502A (R module), a control module 502B (C module), a data module 502C (D module), and a management module 502D (M module). While only one storage controller 504 is shown in the storage system 500 of FIG. 5, for ease of illustration, it will be understood that multiple storage controllers and corresponding modules may be implemented by the storage system 500 in a distributed fashion in order to realize the advantages of the embodiments described herein.

As shown in FIG. 5, the storage controller 504 is communicatively coupled to a storage array 506, which in turn maintains persistent storage devices 508A-508n. In embodiments, the persistent storage devices of the storage array 506 are implemented as JBOF (just a bunch of flash) disks. At least one of the persistent storage devices 508A-508n maintains the scratchpad. As shown in FIG. 5, storage device 508A houses scratchpad 530. The scratchpad 530 (also referred to as scratchpad memory) may be implemented as a pool of DRAM/NVDIMM pages that are allocated for each of a plurality of storage controllers and are externally managed by a client of the storage array. In embodiments, the pool may be allocated in 4 KB pages.

In embodiments, a primary parameter of the scratchpad is a level of protection in terms of how data is to be stored in the storage array. Levels of protection include none, single, and protected. The level of protection "none" indicates that a single copy of the data will be stored in the storage array but in volatile memory only (e.g., DRAM). The level of protection "single" indicates that one copy of the data will be stored in the storage array (in non-volatile memory) for redundancy. The level of protection "protected" indicates that three copies of the data will be stored in the storage array (in non-volatile memory). These levels of protection are described further herein.

In embodiments, the scratchpad 530 is essentially the "landing place" for all write operations. The scratchpad 530 is directly written to using remote direct memory access (RDMA) or Non-Volatile Memory express over Fabric (NVMeoF) operations from the routing module 502A.

By way of non-limiting example, if the estimated size of the scratchpad is 2 GB, and if the system was using 2K entries for a write cache (each being 8K) then the needed space for each cache is 16 MB, where "cache" indicates the scratchpad. Assuming a maximum of 128 storage controllers, the cache size=16 MB×128=2 GB. To improve amortization, the size may be increased at least twofold. Where the NVDIMM 16 GB is present per each JBOF mode, the scratchpad will be entirely in NVDIMM.

The system 500 includes an application programming interface 532 (API) to facilitate 10 operations on behalf of clients 520. The API 532, which may be located between the storage controller and the storage array, facilitates various commands including write, read, incref, decref, and fused. A user writes fixed data blocks through the write command and receives a hash key in response. A user provides a hash key via the read command and receives, e.g., an 8K block of data. Through the incref and decref commands, a user provides a hash key and only metadata associated therewith will be modified. The user can combine several commands above via the fused command. In addition to the above commands, the embodiments include a store command in which a user provides a list of address in the scratchpad and receives back a list of hash keys corresponding to written blocks. In this manner, multiple writes can be aggregated and performed in a single operation.

During an initiation stage of the scratchpad, the C module may ask for the storage array for a portion of the scratchpad. As indicated above, the scratchpad can be implemented with no protection, a single copy protection, or full 3-way copy protection. Each storage controller may choose the desired level of protection. During a synchronous write operation, instead of writing to the write cache in the C module, each storage controller may issue a single RDMA or NVMeoF write to the scratchpad on the storage array. If the level of protection is "single" a second and simultaneous write via RDMA or NVMeoF will be issued to a second portion of the scratchpad (e.g., another portion of the scratchpad or another storage device of the storage array) for high availability protection. Due to the fact that both writes are performed at the same time, latency will not be affected during the synchronous flow.

The scratchpad is allocated among storage controllers in which a memory region (e.g., base address and length) is allocated to each storage controller upon request. The size is provided by the storage controller during the request. If there is no scratchpad space available, an error may be returned to the requesting storage controller.

If the storage controller decides to work with the scratchpad via the protected mode, a single write to the protected area is performed. The storage array is responsible to replicate (mirror) the data three ways for the protection scheme. This flow saves bandwidth on the backend as a single write is performed and all the three-way mirroring is internal to the storage array. The latency savings will be presented in the next asynchronous flow mode using the new store command, where no remote reads need to be performed.

The goal of the store operation is to pass responsibility for the data pages from the storage controllers to the storage array. After this operation returns, the assumption is that the data is safely stored in the storage array and all the resources allocated by the routing/control/data modules can be released at this stage. The store operation is performed as part of a destage process.

The input of the store command includes a set of descriptors (offsets) pointing to the local scratchpad of the storage array. The output of the store command is a set of hashes and optionally opaque cookies that will facilitate read operations in the future.

The asynchronous flow during de-stage operation reflects that all data is residing inside the storage array so there is no need to move the data. In addition, the same operations may be performed inside the storage array that were initially performed via storage controllers (e.g., metadata updates and raid operations). Further a list of hashes is returned only for successful pages written (optionally, cookies may be returned to help in the next read operations). The number of aggregated entries in the store command should be matching the number of entries in the stripe (e.g., 128).

Figure 6:
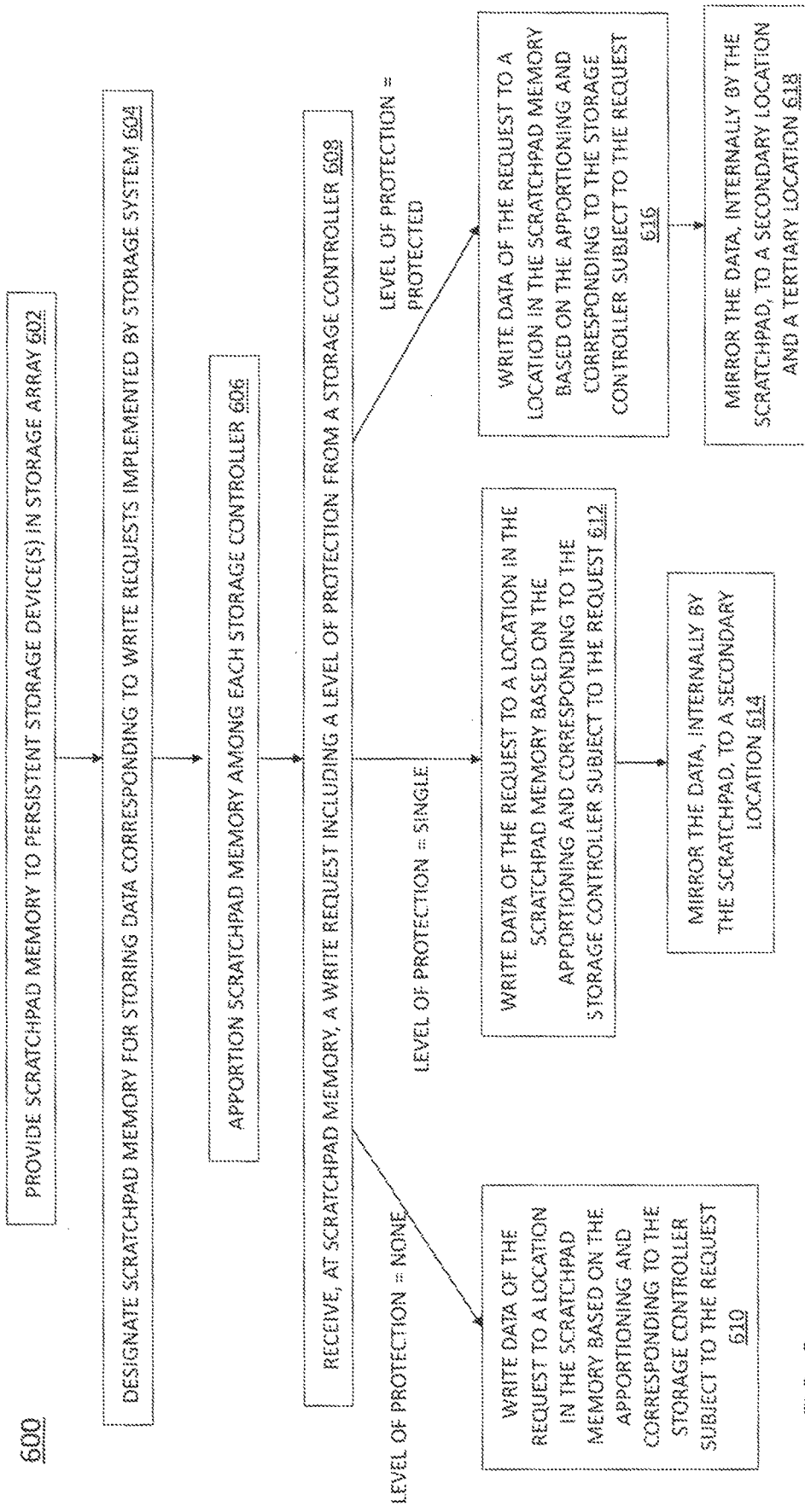
FIG. 6 is a flow diagram for implementing scratchpad journaling in accordance with an embodiment.

Turning now to FIG. 6, a process 600 for scratchpad journaling will now be described. In block 602, the process 600 provides a scratchpad memory to at least one persistent storage device in a storage array. In block 604, this scratchpad memory is designated for storing data corresponding to write requests implemented by the storage system. The data includes user data and metadata that would otherwise be stored in the write cache as described above.

In block 606, the scratchpad is apportioned among each of the storage controllers in the storage system. In an embodiment, and as described above, the apportioning may be implemented during an initiation stage in which a storage controller requests a portion of the scratchpad.

In block 608, the scratchpad receives a write request including a level of protection from a storage controller. If the level of protection is "none," in block 610, the data of the request is written to a location in volatile memory (e.g., DRAM). In block 612, if the level of protection is "single," the data of the request is written to a location in the scratchpad based on the apportioning of the scratchpad to the requesting storage controller, and simultaneously, the data is mirrored internally by the scratchpad, to a second location in the scratchpad in block 614. In block 616, if the level of protection is "protected." the data of the request is written to a location in the scratchpad based on the apportioning of the scratchpad to the requesting storage controller, and simultaneously, the data is mirrored internally by the scratchpad, to a second location and a third location in the scratchpad in block 618. As the scratchpad may span multiple storage devices, it is understood that the data may be stored, mirrored across multiple devices.

As indicated above, the data of the write request is written to a location in the scratchpad memory based on the apportioning through the list of addresses and corresponding hash keys. In a content addressable storage system, the list of addresses is provided to the scratchpad memory via each of the storage controllers through the API that is communicatively coupled to respective storage controllers and the scratchpad memory. The list of addresses include offsets pointing to the scratchpad memory. A list of hash keys is received via the API from the scratchpad memory that correspond to written blocks in the scratchpad memory.

Figure 7:
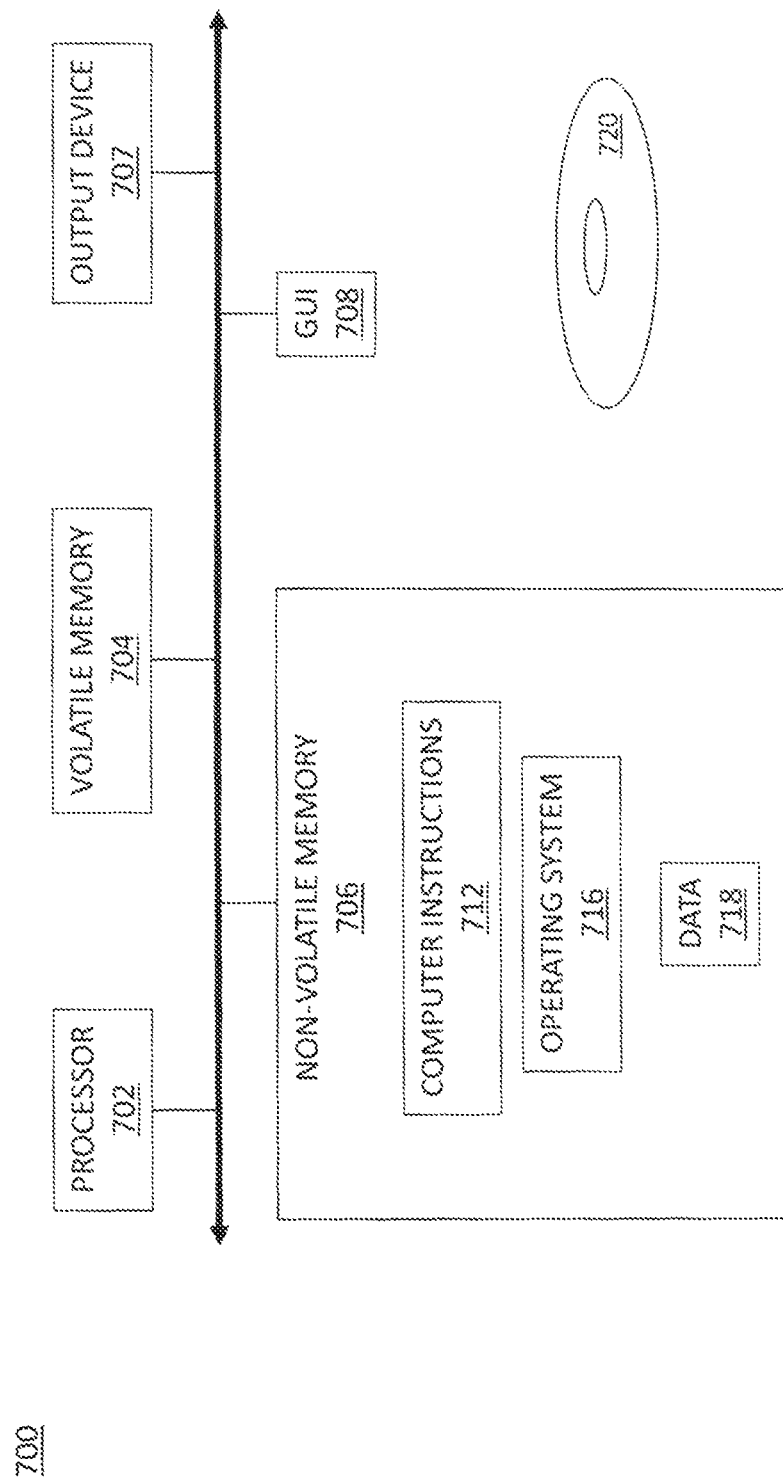
FIG. 7 is a block diagram of an illustrative computer that can perform at least a portion of the processing described herein.

FIG. 7 shows an exemplary computer 700 (e.g., physical or virtual) that can perform at least part of the processing described herein. The computer 700 includes a processor 702, a volatile memory 704, a non-volatile memory 706 (e.g., hard disk or flash), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method, comprising:
providing a scratchpad memory to at least one persistent storage device of a plurality of persistent storage devices in a storage array, the scratchpad memory including non-volatile storage;
designating the scratchpad memory for storing data corresponding to write operations implemented by a storage system;
apportioning the scratchpad memory among each storage controller of a plurality of storage controllers in the storage system;
receiving, at the scratchpad memory, a write request from one of the storage controllers, the write request including a level of protection, wherein the level of protection indicates a number of times data of the write request is to be mirrored; and
writing the data of the write request to a location in the scratchpad memory based on the apportioning and corresponding to the one of the storage controllers.

2. The method of claim 1, wherein the level of protection in the write request is a first level of protection corresponding to the write request and the location is a first location, the method further comprising:
mirroring the data of the write request, internally by the scratchpad memory, to a secondary location in the scratchpad memory based on the apportioning and the first level of protection, wherein the first level of protection indicates single co protection mode.

3. The method of claim 2, wherein writing the data of the write request to the first location in the scratchpad memory is performed simultaneously with the mirroring the data of the write request to the secondary location in the scratchpad memory.

4. The method of claim 1, wherein the level of protection in the write request is a second level of protection corresponding to the write request and the location is a first location, the method further comprising:
mirroring the data of the write request, internally by the scratchpad memory, to a secondary location and to a tertiary location in the scratchpad memory based on the apportioning and the second level of protection, wherein the second level of protection is three-copy protection mode.

5. The method of claim 1, wherein the storage system is a content-addressable storage system, the method further comprising:
providing a list of addresses to the scratchpad memory via each of the storage controllers through an application programming interface (API) that is communicatively coupled to respective storage controllers and the scratchpad memory, the list of addresses including offsets pointing to the scratchpad memory; and
receiving, via the API from the scratchpad memory, a list of hash keys corresponding to written blocks in the scratchpad memory, the hash keys facilitating subsequent read operations;
wherein writing the data of the write request to a location in the scratchpad memory based on the apportioning is implemented via the list of addresses and corresponding hash keys.

6. The method of claim 1, wherein the scratchpad memory includes at least one of virtual storage and physical storage.

7. The method of claim 1, wherein the scratchpad memory includes a combination of dynamic random access memory (DRAM) and non-volatile dual in-line memory modules (NVDIMMs).

8. The method of claim 1, wherein the plurality of persistent storage devices comprises solid state disks.

9. The method of claim 1, wherein the plurality of persistent storage devices comprises a collection of flash disks.

10. A storage system, comprising:
a memory comprising computer-executable instructions; and
a processor operable by the storage system, the processor executing the computer-executable instructions, the computer-executable instructions when executed by the processor cause the processor to perform operations comprising:
providing a scratchpad memory to at least one persistent storage device of a plurality of persistent storage devices in a storage array, the scratchpad memory including non-volatile storage;
designating the scratchpad memory for storing data corresponding to write operations implemented by the storage system;
apportioning the scratchpad memory among each storage controller of a plurality of storage controllers in the storage system;
receiving, at the scratchpad memory, a write request from one of the storage controllers, the write request including a level of protection, wherein the level of protection indicates a number of times data of the write request is to be mirrored; and
writing the data of the write request to a location in the scratchpad memory based on the apportioning and corresponding to the one of the storage controllers.

11. The system of claim 10, wherein the level of protection in the write request is a first level of protection corresponding to the write request and the location is a first location, the operations further comprising:
mirroring the data of the write request, internally by the scratchpad memory, to a secondary location in the scratchpad memory based on the apportioning and the first level of protection, wherein the first level of protection indicates single copy protection mode;

wherein writing the data of the write request to the first location in the scratchpad memory is performed simultaneously with the mirroring the data of the write request to the secondary location in the scratchpad memory.

12. The system of claim 10, wherein the level of protection in the write request is a second level of protection corresponding to the write request and the location is a first location, the operations further comprising:
mirroring the data of the write request, internally by the scratchpad memory, to a secondary location and to a tertiary location in the scratchpad memory based on the apportioning and the second level of protection, wherein the second level of protection is three-co protection mode.

13. The system of claim 10, wherein the storage system is a content-addressable storage system, the operations further comprising:
providing a list of addresses to the scratchpad memory via each of the storage controllers through an application programming interface (API) that is communicatively coupled to respective storage controllers and the scratchpad memory, the list of addresses including offsets pointing to the scratchpad memory; and
receiving, via the API from the scratchpad memory, a list of hash keys corresponding to written blocks in the scratchpad memory, the hash keys facilitating subsequent read operations;
wherein writing the data of the write request to a location in the scratchpad memory based on the apportioning is implemented via the list of addresses and corresponding hash keys.

14. The system of claim 10, wherein the scratchpad memory includes at least one of virtual storage and physical storage.

15. The system of claim 10, wherein the scratchpad memory includes a combination of dynamic random access memory (DRAM) and non-volatile dual in-line memory modules (NVDIMMs).

16. The system of claim 10, wherein the plurality of persistent storage devices comprises solid state disks.

17. The system of claim 10, wherein the plurality of persistent storage devices comprises a collection of flash disks.

18. A computer program product embodied on a non-transitory computer readable medium, the computer program product including instructions that, when executed by a computer, causes the computer to perform operations comprising:
providing a scratchpad memory to at least one persistent storage device of a plurality of persistent storage devices in a storage array, the scratchpad memory including non-volatile storage;
designating the scratchpad memory for storing data corresponding to write operations implemented by the storage system;
apportioning the scratchpad memory among each storage controller of a plurality of storage controllers in the storage system;
receiving, at the scratchpad memory, a write request from one of the storage controllers, the write request including a level of protection, wherein the level of protection indicates a number of times data of the write request is to be mirrored; and
writing the data of the write request to a location in the scratchpad memory based on the apportioning and corresponding to the one of the storage controllers.

19. The computer program product of claim 18, wherein the level of protection in the write request is a first level of protection corresponding to the write request and the location is a first location, the operations further comprising:
mirroring the data of the write request, internally by the scratchpad memory, to a secondary location in the scratchpad memory based on the apportioning and the first level of protection, wherein the first level of protection indicates single copy protection mode;
wherein writing the data of the write request to the first location in the scratchpad memory is performed simultaneously with the mirroring the data of the write request to the secondary location in the scratchpad memory.

20. The computer program product of claim 18, wherein the storage system is a content-addressable storage system, the operations further comprising:
providing a list of addresses to the scratchpad memory via each of the storage controllers through an application programming interface (API) that is communicatively coupled to respective storage controllers and the scratchpad memory, the list of addresses including offsets pointing to the scratchpad memory; and
receiving, via the API from the scratchpad memory, a list of hash keys corresponding to written blocks in the scratchpad memory, the hash keys facilitating subsequent read operations;
wherein writing the data of the write request to a location in the scratchpad memory based on the apportioning is implemented via the list of addresses and corresponding hash keys.

* * * * *